April 9, 1946.　　　H. G. CONWAY　　　2,397,922
ELECTRICAL REMOTE CONTROL DEVICE
Filed Aug. 13, 1943　　　2 Sheets-Sheet 1

Inventor
H. G. Conway
By Watson, Cole, Grindle & Watson
Attorneys

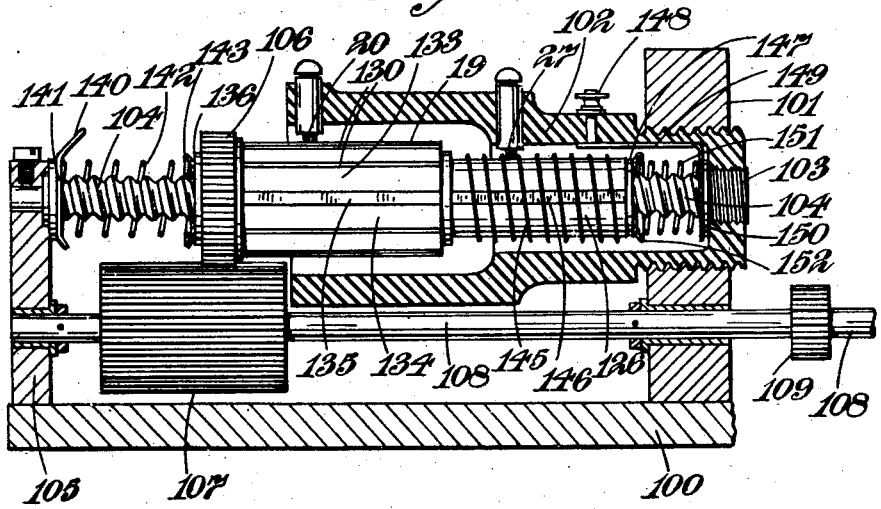
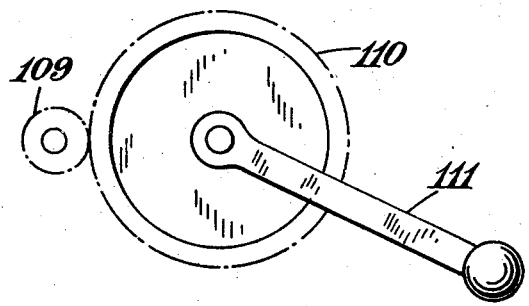
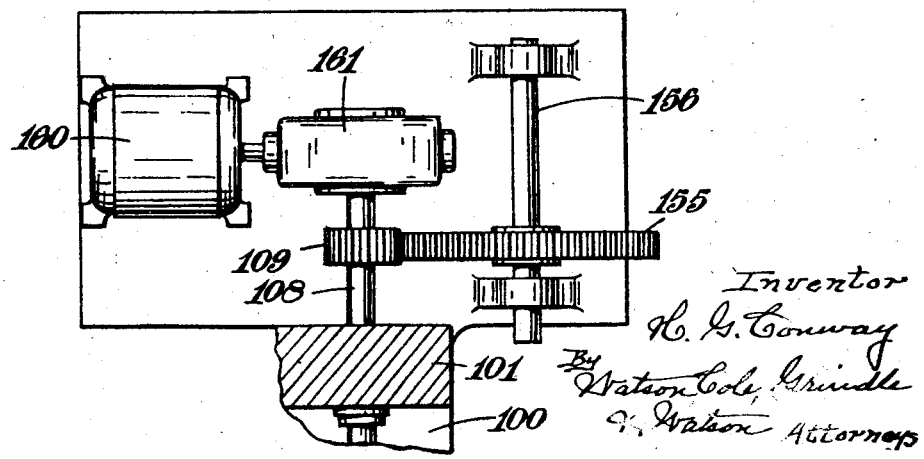

Patented Apr. 9, 1946

2,397,922

UNITED STATES PATENT OFFICE 2,397,922

ELECTRICAL REMOTE CONTROL DEVICE

Hugh Graham Conway, Warrington, England, assignor to Aeronautical & Mechanical Investments Limited, a British company Application August 13, 1943, Serial No. 498,527
In Great Britain December 7, 1942

10 Claims. (Cl. 201—48)

This invention comprises improvements in or relating to electrical remote control devices.

It is an object of the invention to provide means whereby a mechanical movement at one position may be reproduced at a distant position by the aid of electrical interconnecting means.

It is known to reproduce a mechanical movement at a receiving station, the original movement being effected at a transmitting station, by providing two potentiometer resistances, one at the transmitting station and the other at the receiving station, connected in the form of a "bridge" with a relay winding across the bridge, which relay serves to operate a reversible motor at the receiving station geared to the potentiometer. The potentiometer arm of the transmitting station is connected to the operating member whose movement is to be reproduced and thus any movement of this member throws the bridge out of balance, operates the relay and causes the motor to move until the potentiometer arm at the receiving station has moved to a degree corresponding to the movement of the potentiometer of the transmitting station, whereupon further movement ceases because the bridge has been brought into balance again.

The disadvantage of this arrangement is that if a close correspondence between the movements at the transmitting and receiving stations is desired the relay must be very sensitive, and sparking of the contacts and jerking of the operating motor also occur.

It has been proposed, with the object of obviating this difficulty, to provide two bridge circuits with potentiometer resistances at the transmitting and receiving stations, the potentiometers being divided into steps and their moving parts connected together so that one varies much faster than the other and works repeatedly over its range during the balancing of the other, whereby the bridge circuit controlled by the more slowly varying potentiometer serves to effect a coarse adjustment and that controlled by the more rapidly varying potentiometer effects a fine adjustment, and the present invention relates to an apparatus of this type. In apparatus of such a type the fact that the potentiometer sections are arranged stepwise instead of being continuously variable has the effect of ensuring that the controlling relays of the bridge circuits are always operated by substantial variations of current which occur in moving from step to step so that the relay makes contact with certainty and sparking and jerking of the motor are minimised. At the same time the provision of the more rapidly varying potentiometer provides a fine adjustment which sub-divides the steps of movement provided by the more slowly varying potentiometer and so obviates the objection which would otherwise arise that the movement of the transmitting station is only reproduced in a series of coarse approximate stages.

The present invention relates particularly to a form of apparatus for use at a receiving or at a transmitting station, or both, which involves a special arrangement of commutator connected to two potentiometer resistances and adapted by a compound movement to regulate both the coarse and fine adjustment.

The invention includes electrical apparatus for reproducing at a receiving station movement effected at a transmitting station comprising in combination at both said stations coarse-step control and finer-step control potentiometer resistances each divided into sections, bridge circuits between the stations connecting the coarse-step control potentiometer resistances and the finer-step control potentiometer resistances, which bridge circuits include balance circuits, commutators at each station each having two series of contacts and contact brushes bearing on each series, one series of contacts being extended beyond the width of its contact brush in one dimension and the other series similarly extended in another dimension, the one series of contacts being connected to the coarse-step control resistance of the station, section by section, and the other series similarly connected to the finer-step control resistance, the two contact brushes of each commutator being connected in the two balance circuits, means at the transmitting station to move one of the commutators and its contact brushes relatively to one another and at the receiving station means controlled by the balance circuits of the commutators to move the receiving station commutator and its contact brushes relatively to one another until balance is obtained.

As will be evident, while preferably the commutators at both the transmitting and the receiving stations are constructed in the manner described it is also possible for the apparatus to operate if only one of the stations, the transmitting or the receiving station, is provided with a commutator of this kind and the other station has any other form of apparatus for providing a coarse adjustment by means of one potentiometer resistance and a finer adjustment by means of another more rapidly variable resistance. One form of such other apparatus is described in copending United States application in the name of Arnot, Serial No. 498,499, filed August 13, 1943.

One embodiment of the invention will now be described, by way of example, reference being made to the accompanying drawings in which—

Figure 2 is a diagrammatic longitudinal section through a joint commutator containing potentiometer resistances in accordance with the invention;

Figure 3 is a diagram of the driving apparatus for the commutator at the transmitting station;

Figure 4 is a diagrammatic plan view of the driving apparatus at the receiving station.

Figure 1:
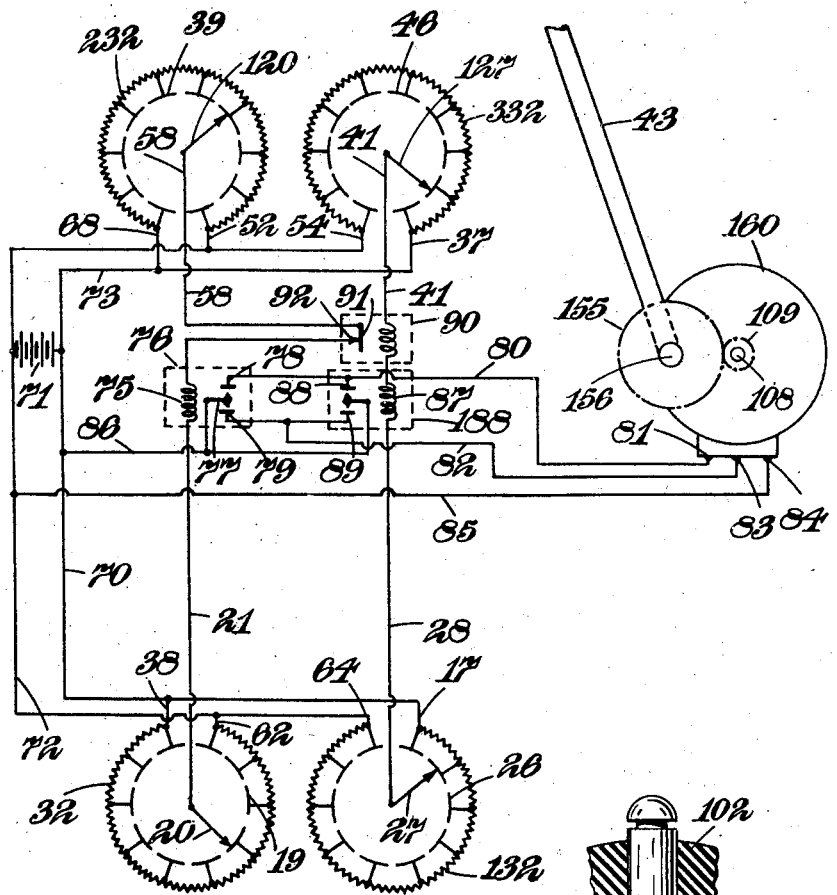
Figure 1 is a diagram of connections.

Referring to Figure 1, commutators 19, 26 of a transmitter are shown at the bottom of the figure and commutators 39, 46 of a receiver at the top of the figure. The commutators consist of a number of segments insulated from one another and connected segment by segment to potentiometer resistances. The commutator 19 is connected to a finer-step potentiometer resistance 32, the commutator 26 to a coarse-step potentiometer resistance 132, the commutator 39 of the receiver is connected to a finer-step potentiometer resistance 232 and the commutator 46 to a coarse-step potentiometer resistance 332. On the commutators there bear brushes 20, 27, 120 and 127 respectively. A line wire 70 connects the ends of the potentiometer resistances to one terminal of a battery 71 by way of leads 17, 38, 37, 68 and a connecting wire 73. The other ends of the potentiometer resistances are connected by leads 62, 64 and 52, 54 to a line wire 72 which is connected to the other pole of the battery 71. The potentiometer resistances are in this way kept supplied with current.

The brush 20 of the finer-step commutator 19 is connected by a line 21 in a balance circuit which comprises a relay winding 75 of a balancing relay 76 to a line 58 connected to the brush 120 of the commutator 39. The brush 27 of the coarse step commutator 26 is connected by a line 28 through the winding 87 of a balancing relay 188 to a line 41 connected to the brush 127 of the commutator 46.

The balancing relay 76 has a polarised armature 77 so that when energised by current in one direction it closes against a contact 78 and when energised by current in the opposite direction it closes against a contact 79. Similarly the balancing relay 188 has an armature which can close alternatively against contacts 88, 89, the contacts 78 and 88 are connected by a line 80 to a terminal 81 of a reversible electric motor 160, the contacts 79, 89 are similarly connected by a line 82 to another terminal 83 of this motor. A third terminal 84 is connected by line 85 to the line 72. The armatures of the relays 76 and 188 are connected by a line 86 to the other terminal of the battery.

The reversible electric motor 160 rotates in one direction when the terminal 81 is energised and in the opposite direction when the terminal 83 is energised. Therefore when either of the bridge circuits constituted by the coarse-step potentiometer resistances and the balance circuit 28, 87, 41 on the one hand, or the finer-step potentiometer resistances and the balance circuit 21, 75, 58 on the other hand is out of balance the motor 160 will be rotated in one direction or the other. The motor 160 is connected by a reduction gear to a shaft 108 on which is a pinion 109 meshing with a gear wheel 155 on shaft 156 which carries lever 43. The shaft 109 moves the commutators 39, 46 relatively to their brushes 120, 127 as hereinafter described.

The brushes 20, 27 of the transmitter are similarly connected to an operating member at the transmitting station the movement of which is to be copied as hereinafter described. Therefore when the brushes 20, 27 are moved by operating the actuating member at the transmitting station the motor 60 will move the brushes 120, 127 and with them the operated member 43 until the balance circuits come into balance, whereupon movement will cease. The actuated member will then be in synchronism with the actuating member.

It will be understood that the brushes 27, 127 of the coarse-step potentiometer are caused to change from segment to segment at a rate which is only one-tenth of the rate at which the brushes 20, 120 of the finer-step potentiometer resistance brushes change from segment to segment.

It is necessary to ensure that only one bridge circuit is balanced at a time and to this end in the finer-step balance circuit line 41 there is interposed an additional relay 90 having an armature 91 which is normally closed against a contact 92 inserted in the line 58 in series with the balance relay 75 of the other balance circuit. Therefore as long as the coarse-step circuit is out of balance the finer-step balance circuit is out of operation. As soon as the coarse-step circuit has been balanced the finer-step circuit is closed and balance is then attained on the finer-step circuit to bring the parts to their final position of adjustment.

The other figures of the drawings show the construction of the apparatus thus connected together.

Referring now to Figures 2 to 5, a base 100 is provided (Figure 2) on one end of which is an upstanding panel 101 into which is screwed a fitting 102 made of insulating material. The fitting 102 is hollow and at the screwed end it receives a plug 103 integral with a long fixed lead screw 104. The other end of the lead screw 104 is supported by a bracket 105 from the base plate 100.

A gear wheel 106 is screw-threaded internally so as to run as a nut on the lead screw 104 and meshes with a long pinion 107 on a shaft 108 which is supported by bearings in the panel 101 and the bracket 105. The shaft 108 carries a driving pinion 109 which is hereinafter referred to. The gear wheel 106 will, as will be seen, be not only rotated upon the lead screw 104 but also advanced in the course of its rotation if the shaft 108 and the pinion 107 are rotated. Attached to the gear wheel 106, but insulated therefrom and from each other, are two commutators 19, 26. A brush 20 bears on the commutator 26 and a brush 27, bears on the commutator 19.

Figure 5:
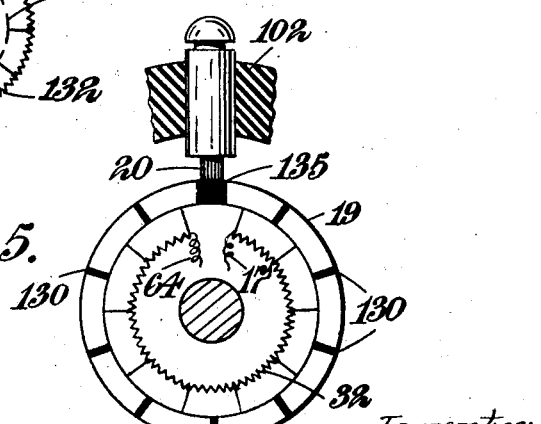
Figure 5 is a diagrammatic cross-section of the commutator shown in Figure 1 in order to indicate the internal arrangement of the resistances.

The commutator 19 consists of ten longitudinally disposed conducting sections which are separated by insulation 130. Between two of the metallic conductors 133, 134 there is a broader insulating strip 135, broad enough to prevent the brush 20 from bridging across the strips 133, 134. Within the commutator 19 there are disposed ten sections of the potentiometer resistance 32, as indicated in Figure 5 of the drawings, the ends of the resistance being connected on the one hand by lead 17 to the frame of the apparatus through the gear wheel 106 and the lead screw 104 (which are connected to the lead 70, Figure 3) and on the other hand by lead 64 to a slip-ring 136, arranged on the face of the gear wheel 106 and insulated therefrom. As the gear wheel 106 not only rotates but also travels it is necessary to arrange special means to conduct the current to and from the slip-ring 136. To this end there is a terminal tag 140 supported by and insulated from the bracket 105 which has a base 141 surrounding the lead screw 104. A spring 142 extends from this terminal back into engagement with a washer 143 which bears against the slip-ring 136. The spring 142 is made sufficiently light and flexible to permit the whole movement endwise of the gear wheel 106 without offering undue resistance to the rotation thereof.

The second commutator 26 is also provided with ten segments but instead of these extending longitudinally they extend circumferentially around the commutator 26 and are separated from one another by a helical insulating strip 145 and by a series of insulating blocks 146 which, however, in this case are not made broad enough to prevent the brush 27 from spanning across from section to section and which are arranged in a longitudinal line parallel with the axis of the commutator. The pitch of the helix of the insulating strip 145 is made the same as the pitch of the lead screw 104.

Within the commutator 26 there are a series of ten resistance units arranged as a potentiometer, each unit being connected to one of the commutator sections. One end of the potentiometer resistance is electrically connected to the frame of the apparatus as before and the other end is connected to a slip-ring 147 on the end of the commutator 126. A terminal 148 is connected by a metallic strip 149 to an insulated washer 150 which surrounds the lead screw 104 without touching it. The washer 150 is connected to the slip-ring 147 by means of a light spring 151 and an interposed washer 152 in a similar way to that described in connection with the spring 142 at the other end of the commutator.

The apparatus of Figure 2 is used for the transmitter and another identical apparatus for the receiver. In the transmitter the pinion 109 is driven by a gear wheel 110 from the actuating member 111 the movement of which is to be reproduced. The gearing is shown in Figure 3 of the drawings, the other parts, however, being omitted. In the receiver the arrangement is as shown in Figure 4, where the shaft 108 is shown connected by the pinion to a driven pinion 155 on a driven shaft 156, the movement of which is intended to reproduce the movement of the actuating member 111. The shaft 108 is caused to move when the actuating member 111 is moved by means of a motor 160 operating the shaft 108 at a relatively low speed through the worm reduction gear 161. It will be understood that the construction of the commutator parts in the receiver, which are numbered in Figure 1, 39 and 46 respectively correspond exactly to the construction of the transmitter parts 19 and 26, the brushes 120 and 127 corresponding in a similar way to the brushes 20 and 27 as shown in Figure 2.

Although the commutators have been described as rotating and the brushes as fixed, it will be understood that the commutators could be fixed and the brushes made to rotate. The potentiometer resistances need not be located within the commutators themselves as they may be connected thereto by appropriate leads.

I claim:
1. Electrical apparatus for transmitting movement between distant stations comprising in combination an operating member, a commutator operatively connected to the operating member to be driven thereby, the said commutator comprising two series of contacts, contact brushes bearing on each series, one series of contacts being extended beyond the width of its contact brush in one dimension and the other series simultaneously extended in another dimension, a coarse-step control potentiometer resistance divided into sections connected to one of said series of contacts section by section, a finer-step control potentiometer resistance divided into sections connected to the second series of commutator contacts section by section, the operating member being so connected to the commutator as to move the commutator and brushes relatively to one another at a rate which causes the finer-step series of contacts to come into contact repeatedly with their brush while the series of contacts of the coarse-step control engage their contact brush once.

2. Apparatus as claimed in claim 1, wherein the commutator comprises one of said series of contacts arranged as segments around the surface of a cylinder, the segments extending parallel to the axis of the cylinder and a second series of contacts arranged so as to extend circumferentially around the commutator and wherein movement in one dimension to vary the segments of the first said portion of the commutator is effected by rotation thereof and movement in the other dimension is effected axially.

3. Apparatus as claimed in claim 1, wherein the first of said series of contacts of the commutator is arranged as a series of segments extending longitudinally along a cylindrical portion of the commutator and the second of said series of contacts is arranged as a series extending circumferentially along a helical path and the commutator is arranged to rotate in a helical path so that its movement combines rotational and helical movements to vary the two sections of each commutator simultaneously.

4. Apparatus as claimed in claim 1, wherein the commutator segments are arranged about a circular surface and the width of the insulation between the adjacent segments which are connected to opposite ends of one of the potentiometer resistances is greater than that of the brush bearing thereon so as to avoid short-circuiting the brush.

5. Apparatus as claimed in claim 1, wherein the commutator contacts are located on a circular surface and the potentiometer resistances are located within the contacts.

6. Electrical apparatus for transmitting movement between distant stations comprising in combination a rotatable carrying member, a series of electrically conductive commutator segments carried thereby which extend parallel with the axis of the operating member so as to form a complete cylindrical commutator, electrical insulation between the segments, and a second series of electrically conductive commutator segments extending helically around the axis of the carrying member, each of said second series of segments extending around a complete circle except for insulation subdividing them, a set of potentiometer resistance sections connected to the first set of commutator segments, a second set of potentiometer resistance sections connected to the second set of commutator segments, means whereby rotation of the whole commutator by the operating member serves not only to rotate it but also to move it axially with a pitch corresponding to the pitch of the helical commutator segments, brushes bearing one on each of the sets of commutator segments for connection to line, and means to rotate the commutator to various positions relatively to said brushes.

7. Apparatus as claimed in claim 6, wherein the insulation between the end segments of the potentiometer series of the first set is of greater width than the brush bearing thereon to obviate short circuit of the potentiometer resistance as a whole.

8. Apparatus as claimed in claim 6, wherein the potentiometer resistance sections are located within the contact segments of the commutator and secured thereto to move therewith.

9. Apparatus as claimed in claim 6, wherein the means whereby rotation of the commutator moves it also axially comprise a fixed lead screw on which the carrying member is mounted so as to be screwed along when rotated and the means to rotate the commutator comprises a gear wheel on the carrying member meshing with another gear wheel on an operating shaft.

10. Apparatus as claimed in claim 6, wherein the means whereby rotation of the commutator moves it also axially comprise a fixed lead screw on which the carrying member is mounted so as to be screwed along when rotated and the means to rotate the commutator comprises a gear wheel on the carrying member meshing with another gear wheel on an operating shaft, and wherein means are provided for conducting current to potentiometer resistances located within the commutator comprising contact rings on each end of the commutator, contact members bearing thereon, and helical springs surrounding the lead screw to press the contact members against the contact rings.

HUGH GRAHAM CONWAY.